(12) United States Patent
Svoboda et al.

(10) Patent No.: US 10,789,300 B2
(45) Date of Patent: Sep. 29, 2020

(54) METHOD AND SYSTEM FOR PROVIDING SECURITY IN A DATA FEDERATION SYSTEM

(71) Applicant: Red Hat, Inc., Raleigh, NC (US)

(72) Inventors: Rostislav Svoboda, Slapanice (CZ); Pavel Slavicek, Brno (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 763 days.

(21) Appl. No.: 14/263,821

(22) Filed: Apr. 28, 2014

(65) Prior Publication Data

US 2015/0310067 A1    Oct. 29, 2015

(51) Int. Cl.
*G06F 16/903* (2019.01)
*G06F 21/62* (2013.01)
*H04L 29/06* (2006.01)

(52) U.S. Cl.
CPC .... *G06F 16/90335* (2019.01); *G06F 21/6218* (2013.01); *H04L 63/20* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 6,338,068 B1 * | 1/2002 | Moore | G06F 17/30893 707/999.102 |
| 6,990,513 B2 | 1/2006 | Belfiore et al. | |
| 7,562,382 B2 | 7/2009 | Hinton et al. | |
| 7,606,791 B2 * | 10/2009 | Dettinger | G06F 17/30551 707/999.002 |
| 7,698,375 B2 | 4/2010 | Hinton et al. | |
| 8,042,162 B2 | 10/2011 | Blakley, III et al. | |

(Continued)

FOREIGN PATENT DOCUMENTS

EP    2372575 A1    10/2011

OTHER PUBLICATIONS

Sascha Neinert, A Federated Authorization and Authentication Infrastructure for Unified Single Sign On, Computing Centre University of Stuttgart, retrieved on Apr. 25, 2014 from http://edoc.hu-berlin.de/conferences/dfn2007/neinert-sascha-139/PDF/neinert.pdf, 7 pages.

(Continued)

*Primary Examiner* — Ashish Thomas
*Assistant Examiner* — Jedidiah P Ferrer
(74) *Attorney, Agent, or Firm* — Haynes and Boone, LLP

(57) ABSTRACT

An example method of controlling access to data stored in a plurality of autonomous data sources includes receiving a federated query including a plurality of source queries. The method also includes receiving a request to submit a source query to a target data source. The method further includes determining whether the request matches at least one rule stored in a rules database. A rule that includes a given query matches a request that includes the given query. The method also includes when it is determined that the request does not match a rule stored in the rules database, sending a communication to cause (i) the source query to be submitted to the data source, and (ii) an initial result of the source query to be masked. The initial result of the source query has the same structure as the masked result of the source query.

17 Claims, 5 Drawing Sheets

(56) References Cited

U.S. PATENT DOCUMENTS

| | | | |
|---|---|---|---|
| 8,402,081 B2 | 3/2013 | Sandoval et al. | |
| 2006/0053478 A1* | 3/2006 | Horman | G06F 21/604 726/1 |
| 2007/0110224 A1* | 5/2007 | Gumpel | G06F 17/3092 707/E17.126 |
| 2008/0177770 A1* | 7/2008 | Friedlander | G06F 17/30566 707/999.101 |
| 2008/0189243 A1* | 8/2008 | Li | G06F 17/30967 707/999.002 |
| 2009/0089591 A1* | 4/2009 | Mattsson | G06F 21/6227 713/193 |
| 2009/0125540 A1* | 5/2009 | Dettinger | G06F 17/30545 707/999.102 |
| 2010/0205189 A1* | 8/2010 | Ebrahimi | G06F 21/6227 707/757 |
| 2011/0066951 A1 | 3/2011 | Ward-karet et al. | |
| 2011/0113050 A1* | 5/2011 | Youn | G06F 21/6218 707/757 |
| 2011/0131222 A1* | 6/2011 | DiCrescenzo | G06F 16/2465 707/757 |
| 2011/0208758 A1* | 8/2011 | Yehaskel | G06F 17/30634 707/752 |
| 2013/0110876 A1* | 5/2013 | Meijer | G06F 21/6227 707/783 |
| 2013/0205364 A1* | 8/2013 | Kiehtreiber | G06F 21/51 726/1 |
| 2013/0282697 A1* | 10/2013 | Barbas | G06F 17/30483 707/722 |

OTHER PUBLICATIONS

Tom Barton et al., Identity Federation and Attribute-based Authorization through the Globus Toolkit, Shibboleth, GridShib and MyProxy, retrieved on Apr. 25, 2014 from http://toolkit.globus.org/toolkit/presentations/gridshib-pki06-final.pdf, 14 pages.

Benjamin Fabian et al., Access Control for Semantic Data Federations in Industrial Product-Lifecycle Management, Computers in Industry, retrieved on Apr. 25, 2014 from http://www.sciencedirect.com/science/article/pii/S0166361512001340, 11 pages, vol. 63, Issue 9, Copyright © 2012, Eserver B.V.

* cited by examiner

METHOD AND SYSTEM FOR PROVIDING SECURITY IN A DATA FEDERATION SYSTEM

FIELD OF DISCLOSURE

The present disclosure generally relates to a federated system, and more specifically to security in a federated system.

BACKGROUND

Nowadays a corporation typically has more than one enterprise software system that provides features for aspects of the corporation's business. For example, a corporation may use several different specialized software systems such as customer relationship management, bookkeeping, and resources planning systems. Additionally, business data is stored at multiple locations and in multiple databases, and the data may be maintained by different business entities. To prepare a deep analysis of its business, it may be desirable for the corporation to analyze a substantial amount of its business data. To perform such a heavy task, the corporation may use data federation technology.

Data federation technology provides the corporation with the ability to aggregate data from disparate data sources into a virtual database so that the data can be used for complex data analysis. The virtual database created by data federation technology does not contain the data itself. Rather, the virtual database contains information about the actual data and their location, and the actual data is left in its original place. The use of data federation may be especially useful when a corporation's data is stored offsite, for example, by a third-party cloud service provider.

A federated system is a collection of cooperating but autonomous data sources belonging to a federation. The data sources belonging to the federation cooperate with each other yet maintain some degree of autonomy. A federated system allows a client to send requests to multiple data sources with the use of a single federated query. A federated query is a query that contains several embedded source queries, and each source query is specific to a data source. A source query that is specific to a data source is written in a format that is understandable by the data source and may be executable at the data source. In a federated system, a federated server may receive a federated query from the client and send each source query embedded in the federated query to the appropriate data source for execution. When a client submits a federated query, the federated server may return a result of the federated query by retrieving results from the applicable data sources.

BRIEF SUMMARY

It may be desirable to provide security in a federated system. Methods, systems, and techniques for controlling access to data stored in a plurality of databases are provided.

According to an embodiment, a method of controlling access to data stored in a plurality of autonomous data sources includes receiving at an access controller a federated query including a plurality of source queries. Each source query of the plurality of source queries is specific to an autonomous data source belonging to a federation. The method further includes receiving at the access controller a request to submit a source query of the plurality of source queries to a target data source. The request is from a request controller, and the target data source is specific to the source query. The method also includes determining whether the request matches at least one rule stored in a rules database. A rule that includes a given query matches a request that includes the given query. The method further includes when it is determined that the request does not match a rule stored in the rules database, sending a communication to the request controller to cause the request controller to (i) submit the source query to the data source, and (ii) mask an initial result of the source query. The initial result of the source query has the same structure as the masked result of the source query.

According to another embodiment, a system for controlling access to data stored in a plurality of autonomous data sources includes a communications module that receives a federated query including a plurality of source queries and receives a request to submit a source query of the plurality of source queries to a target data source. Each source query of the plurality of source queries is specific to an autonomous data source belonging to a federation. The request is from a request controller, and the target data source is specific to the source query. The system also includes an analyzer that determines whether the request matches at least one rule stored in a rules database. A rule that includes a given query matches a request that includes the given query. The system further includes an instructor that when it is determined that the request does not match a rule stored in the rules database, sends a communication to the request controller to cause the request controller to (i) submit the source query to the data source, and (ii) mask an initial result of the source query. The initial result of the source query has the same structure as the masked result of the source query.

According to another embodiment, a non-transitory machine-readable medium including a plurality of machine-readable instructions that when executed by one or more processors is adapted to cause the one or more processors to perform a method including: receiving a federated query including a plurality of source queries, each source query of the plurality of source queries being specific to an autonomous data source belonging to a federation; receiving a request to submit a source query of the plurality of source queries to a target data source, the request being from a request controller, and the target data source being specific to the source query; determining whether the request matches at least one rule stored in a rules database, where a rule that includes a given query matches a request that includes the given query; and when it is determined that the request does not match a rule stored in the rules database, sending a communication to the request controller to cause the request controller to (i) submit the source query to the data source, and (ii) mask an initial result of the source query, the initial result of the source query having the same structure as the masked result of the source query.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
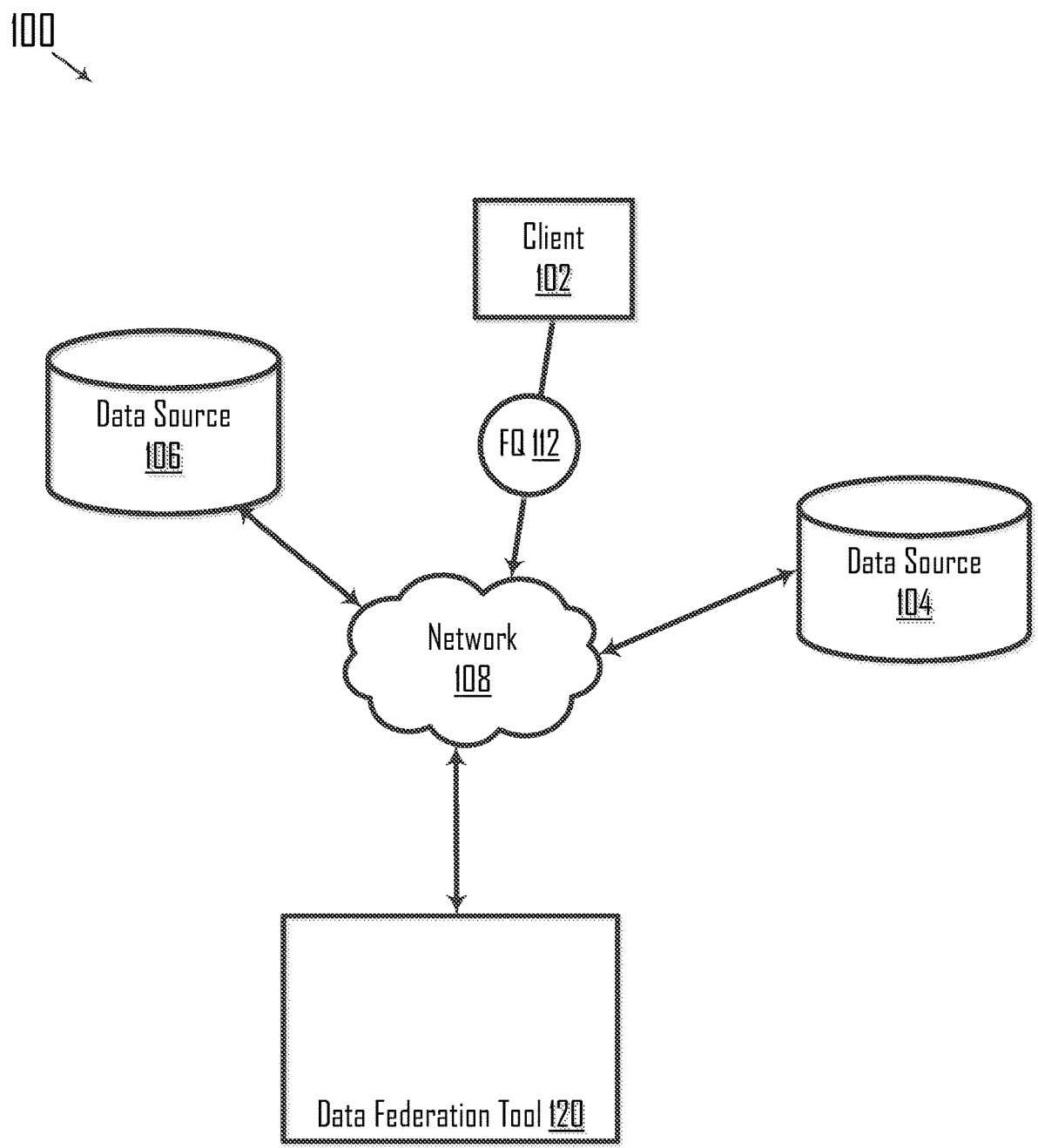
FIG. 1 is a block diagram illustrating a federated system for processing a federated query, according to an embodiment.

Embodiments of the present disclosure and their advantages are best understood by referring to the detailed description that follows.

DETAILED DESCRIPTION

I. Overview
II. Process a Federated Query
III. Example System Architecture
   A. Send Federated Query
   B. Control Access to Data Stored in a Plurality of Data Sources
     1. History Database
     2. Rules Database
IV. Interaction Between Access Controller and Request Controller
   A. Delay Execution of Source Query Against Data Source
   B. Request Matches a Rule
   C. Request does not Match a Rule
V. Final Result
   A. Request Proxy Interacts with the Access Controller
   B. Request Proxy May Send Final Result to Client
VI. Example Method
VII. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

In a federated system, a single query can result in data being extracted from a plurality of databases. A target data source may refer to a data source to which a query is to be sent. While, on an individual basis, the data extracted from each database may not be identified as being particularly sensitive, a combination of data from the plurality of databases may be sensitive.

For example, a bank may have a customer database that stores customer information, such as name, address, telephone number, and date of birth for all customers. The bank may also have a separate account database, containing the customer's name, bank account number(s), and account details (e.g., balance). Someone having access to only one or other of these databases would not be able to use the information to carry out identity theft or bank fraud. In a data integration system scenario, however, it may be possible to enter a customer name and obtain access to a unified view of the customer's information, including all of the information from both databases. It may be appreciated that a combination of the information could be used for identity theft or bank fraud.

Further, in order to retrieve results, trust is typically established between a data federation tool and the data provider. Establishing trust, however, may present problems in some use cases. A full trust relationship may or may not exist between a data provider and a data federation tool in the federated system. For example, the data provider may be a different business entity than the business entity providing the data federation tool. In such an example, the data provider may not want to grant access to all of the data provider's business data to the data federation tool, may want to limit the frequency of incoming queries from the data federation tool, or may want to know how the data federation tool is using the data. If a full trust relationship does not exist between the data provider and data federation tool, it may be desirable for the data provider to be able to control what data is extracted and provided to the data federation tool. It may be desirable to have additional controls and restrictions applied to the extraction of data.

According to an embodiment, a method of controlling access to data stored in a plurality of autonomous data sources includes receiving at an access controller a federated query including a plurality of source queries. Each source query of the plurality of source queries is specific to an autonomous data source belonging to a federation. The method further includes receiving at the access controller a request to submit a source query of the plurality of source queries to a target data source. The request is from a request controller, and the target data source is specific to the source query. The method also includes determining whether the request matches at least one rule stored in a rules database. A rule that includes a given query matches a request that includes the given query. The method further includes when it is determined that the request does not match a rule stored in the rules database, sending a communication to the request controller to cause the request controller to (i) submit the source query to the data source, and (ii) mask an initial result of the source query. The initial result of the source query has the same structure as the masked result of the source query.

Unless specifically stated otherwise, as apparent from the following discussion, it is appreciated that throughout the description, discussions utilizing terms such as "receiving", "determining", "sending", "setting", "masking", "unmasking", and "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Process a Federated Query

FIG. 1 is a block diagram illustrating a federated system 100 for processing a federated query, according to an embodiment. System 100 includes a client 102, data source 104, data source 106, and data federation tool 120 coupled via a network 108. Although one client and two data sources are illustrated, this is not intended to be limiting, and system 100 may include one or more clients and one or more data sources.

Client 102 may be a personal computer (PC), workstation, mobile device (e.g., a mobile phone, personal digital assistant (PDA), tablet, and laptop), game console, set-top box, kiosk, embedded system, or other device having at least one processor and memory. Client 102 may also be an application run on a PC, server, database, etc. Additionally, client 102 may be a fat client (e.g., a client that performs local processing and data storage), a thin client (e.g., a client that performs minimal or no local processing and minimal to no data storage), and/or a hybrid client (e.g., a client that performs local processing but little to no data storage).

Data sources 104 and 106 may be autonomous data sources that belong to a federation. The data sources may be external systems that store data accessible over network 108. In an example, data sources 104 and 106 are heterogeneous data sources that accept different query formats relative to each other. Data sources 104 and 106 may be provided from the same data provider or different data providers. In an example, data source 104 is an ORACLE® database provided by ORACLE®, and data source 106 is a DB2® database provided by IBM®. Trademarks are the properties of their respective owners. In another example, data source 104 is an ORACLE® database, and data source 106 is a web service.

Data federation tool 120 may execute on a computing device having at least one processor for executing and otherwise processing instructions and further having a memory device for storing information (e.g., instructions executed by the processor and data operated upon by the processor in response to such instructions). In an example, data federation tool 120 executes on a federated server that may be a single machine or may include multiple interconnected machines (e.g., machines configured in a cluster). Data federation tool 120 mines data from autonomous data sources that are managed by data providers. A data provider is an entity that owns, controls, and manages data. Data federation tool 120 accesses data from multiple, heterogeneous data sources, and creates reusable, business-friendly logical data models and views by combining and transforming data. In an example, data federation tool 120 is JBOSS® DATA VIRTUALIZATION provided by RED HAT®. Data federation engine 122 may make unified data consumable through standard interfaces. In an example, data federation tool 120 makes unified data consumable through open standard interfaces.

Network 108 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Client 102 may send a federated query 112 to data federation tool 120 for processing. Federated query 112 includes a plurality of source queries that may each be sent to one or more different data sources belonging to the federation (e.g., data sources 104 and 106). Client 102 may submit the high-level federated query to data federation tool 120 for processing without knowing where the data actually resides (e.g., in data source 104 or data source 106). In an example, the federated query is a federated join query. Data federation tool 120 enables client 102 to treat data sources belonging to the federation as one virtual database and access them with the use of a single federated query.

Figure 2:
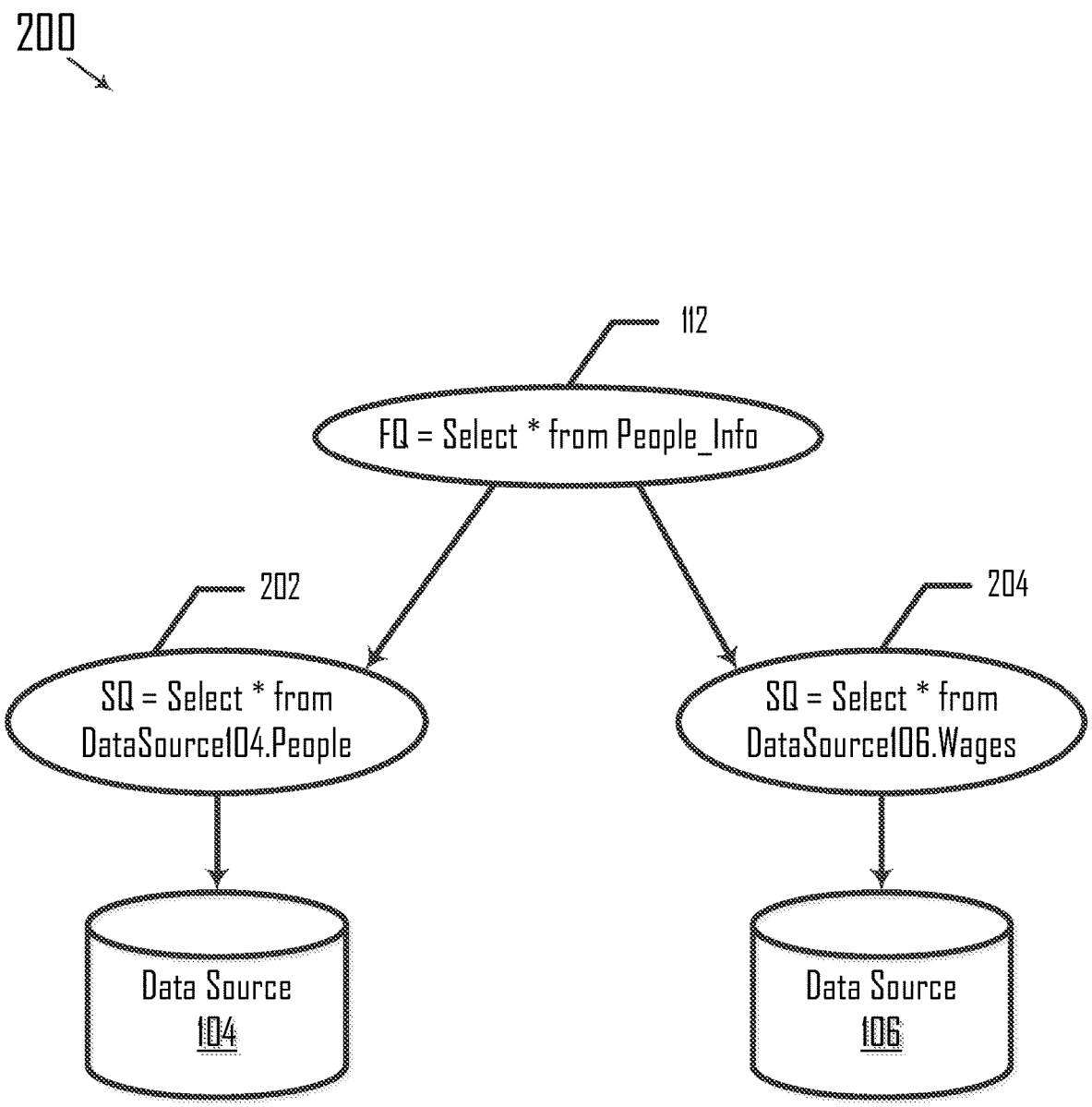
FIG. 2 is an example of a federated query, according to an embodiment.

FIG. 2 is an example 200 of a federated query, according to an embodiment. In the example illustrated in FIG. 2, federated query 112 is a query, "Select*from People_Info", that retrieves information about people in an organization (e.g., employees of the organization and wages). Data federation tool 120 may identify a plurality of autonomous data sources to which to send the plurality of source queries embedded in federated query 112. Data federation tool 120 receives federated query 112 and breaks it down into a federated query plan. The federated query plan defines one or more target data sources belonging to the federation and one or more source queries to be executed against each of the one or more target data sources. Each source query of the plurality of source queries is specific to an autonomous data source belonging to the federation.

The source queries are distributed to the data sources in accordance with the federated query plan. Data federation tool 120 breaks down federated query 112 into a federated query plan that includes embedded source queries 202 and 204. The federated query plan identifies data source 104 as being the target data source of source query 202 and identifies data source 106 as being the target data source of source query 204.

In an example, data federation tool 120 breaks federated query 112 into a federated query plan that includes two different source queries 202 and 204. Source query 202 is a query, "Select*from DataSource104.People", where "DataSource104" is a source of the table "People". In such an example, source query 202 is specific to data source 104, which stores at least a table "People" from which data is retrieved based on execution of source query 202 against data source 104. Source query 204 is a query, "Select*from DataSource106.Wages", where "DataSource106" is a source of the table "Wages". In such an example, source query 204 is specific to data source 106, which stores at least a table "Wages" from which data is retrieved based on execution of source query 204 against data source 106. In an example, source query 202 is not executable at data source 106, and source query 204 is not executable at data source 104.

Data federation tool 120 may aggregate the results from the different data sources and provide a common view of the result. A data view is a basic building block of data federation and may be used in the scope of one federated query. Data federation tool 120 may break down federated query 112 into source queries 202 and 204 that may or may not be eventually submitted to their respective data sources for processing and execution, as will be further discussed below.

III. Example System Architecture

Figure 3:
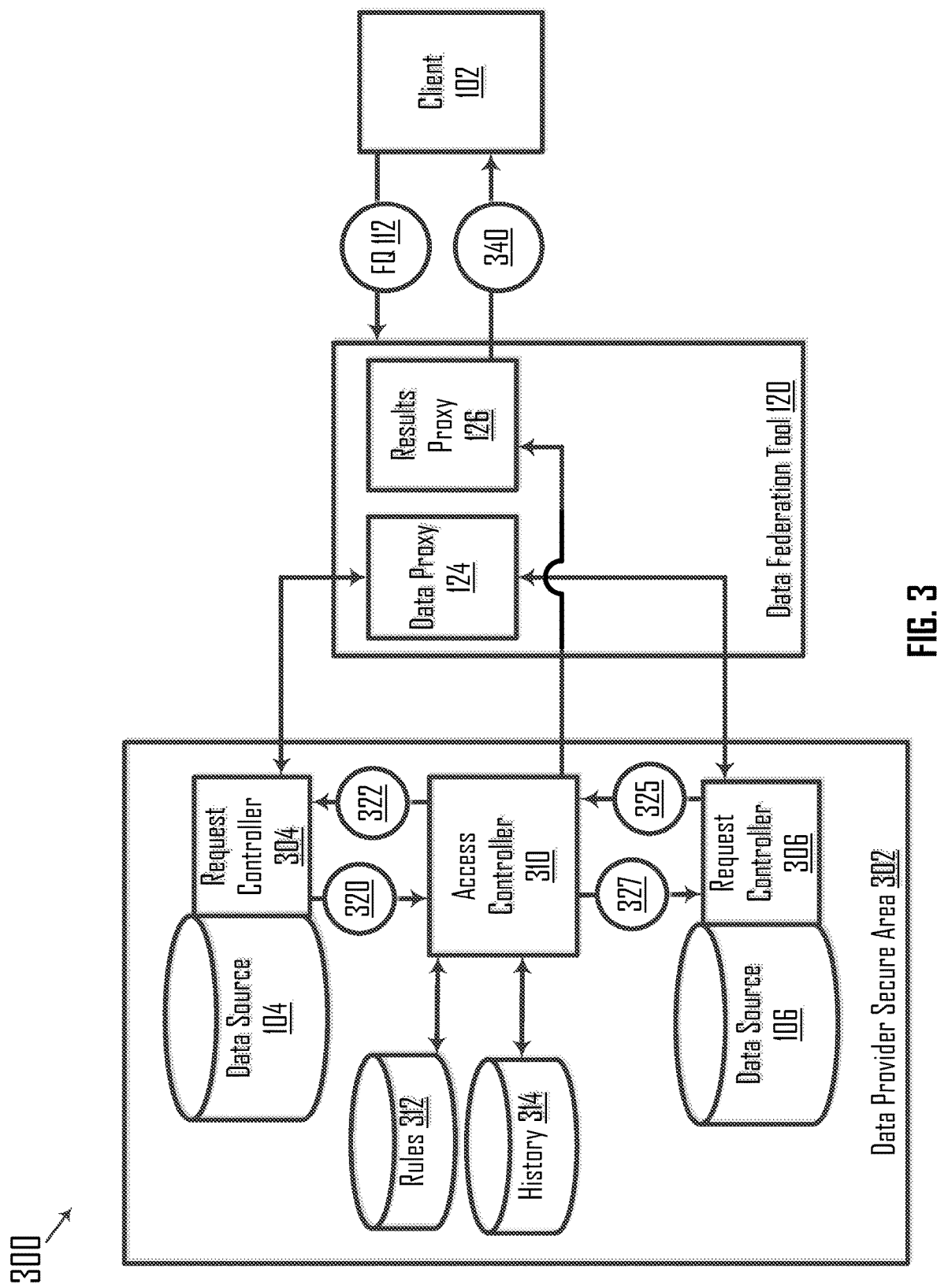
FIG. 3 is a block diagram illustrating a federated system for controlling access to data stored in a plurality of autonomous data sources, according to an embodiment.

FIG. 3 is a block diagram illustrating a federated system 300 for controlling access to data stored in a plurality of autonomous data sources, according to an embodiment. System 300 includes client 102, data provider secure area 302, and data federation tool 120. Data sources 104 and 106 are provided by the same or different data providers. A data provider and data federation tool 120 may be associated with different business entities. Accordingly, the data provider may be skeptical of granting data federation tool 120 full access to all of the data provider's data. Additionally, the data provider may desire to limit the frequency of incoming queries from data federation tool 120. This may avoid a data source from becoming overloaded by too many requests.

The present disclosure provides techniques to control access to data stored in a plurality of autonomous data sources. For example, components system 300 may remove the requirement of a full trust relationship between the data provider and data federation tool 120. Rather, limited trust may be set up between the data provider and data federation tool 120 to enable a specific set of data stored in the autonomous data sources to be retrieved. Trust may be based on information about the full context of how data is being used by data federation tool 120. In an example, a single node's data access permissions are set based on the full data cluster context in the distributed data federation scenario.

The data provider may dynamically control access to a set of its data stored in a data source. For example, the data provider may grant or revoke access permission to the set of data. The decision to grant or revoke access permission to a particular set of data may be made by taking into consideration the full context of how data is used by data federation tool 120 or client 102. The data provider may have information about data from all of the data sources, even from data sources from different data providers.

A. Send Federated Query

In FIG. 3, data federation tool 120 includes a data proxy 124 and results proxy 126. Data proxy 124 and results proxy 126 may execute on a computing device having at least one processor and memory. Data federation tool 120 communicates with a data source located in data provider secure area 302 via data proxy 124 and a request controller that guards the data source. Data proxy 124 may make this communication transparent to data federation tool 120 and provide an abstraction layer for the communication. Data proxy 124 manages communications with the request controllers and handles the distribution of the source queries embedded in federated query 112 to the appropriate request controllers. In an example, data federation tool 120 does not have control of any of the request controllers.

Results proxy 126 represents a proxy between data federation tool 120 and client 102. Results proxy 126 may send a final result 340 based on the execution of the source queries embedded in federated query 112 to client 102. When data federation tool 120 is in the demo phase (e.g., demonstration phase), as will be explained in further detail below, results proxy 126 may re-route data included in final result 340 to the registered data providers for further analysis.

Data provider secure area 302 includes data sources 104 and 106, request controllers 304 and 306, and access controller 310. In the example illustrated in FIG. 3, the request controllers and access controller 310 are separate from data federation tool 120. Request controller 304 "guards" data source 104 and submits queries to data source 104, and request controller 306 "guards" data source 106 and submits queries to data source 106. In an example, data federation tool 120 is unable to communicate with a request controller located in data provide secure area 302 without data proxy 124. In another example, data federation tool 120 is unable to send source queries directly to a data source. Rather, data federation tool 120 may send source queries to a data source via data proxy 124 and the request controller that guards the data source.

Data proxy 124 sends each of source queries 202 and 204 embedded in federated query 112 to a request controller that guards the data source specific to the respective target source query. Data proxy 124 may also send federated query 112 to the request controller so that it knows the federated query in which the source query is embedded. Request controller 304 may receive federated query 112 and recognize that source query 202 embedded in federated query 112 is specific to data source 104. Request controller 304 may then request the services of access controller 310 to determine whether to submit source query 202 to data source 104. Similarly, request controller 306 may receive federated query 112 and recognize that source query 204 embedded in federated query 112 is specific to data source 106. Request controller 306 may then request the services of access controller 310 to determine whether to submit source query 204 to data source 106.

B. Control Access to Data Stored in a Plurality of Data Sources

Data proxy 124 represents an abstraction of the data source for data federation tool 120 and may be, for example, a unified interface that mediates between data federation tool 120 and access controller 310. The request controllers and access controller are located in data provider secure area 302 and enable the data provider to understand how data being extracted based on federated query 112 is being used before the data provider actually discloses the data provider's actual data (e.g., the results of the federated query).

A request controller controls how data is processed and acts as a gatekeeper for the data source that the request controller guards. In an example, the request controller receives a source query to execute against a data source and may or may not execute the source query against the data source. Before the request controller submits the source query to the data source, the request controller requests permission from access controller 310 to do so. Accordingly, request controllers 304 and 306 may interact with access controller 310 to determine whether or not to submit a query to their respective data sources. Access controller 310 defines how incoming requests are evaluated and controls the behavior of the request controllers. Each request controller may base its behavior on instructions in a response from access controller 310.

The following is a description of request controller 304 interacting with access controller 310. This description applies as well to request controller 306. In an example, request controller 304 sends request 320, which may be a request to submit source query 202 to target data source 104. Request controller 304 knows that source query 202 is embedded in federated query 112 and may also send this information to access controller 310. Accordingly, request 320 may also include federated query 112. Access controller 310 receives request 320 and creates a response 322 including an instruction that causes request controller 304 to perform an action in relation to source query 202.

1. History Database

Access controller 310 is coupled to a history database 314 and a rules database 312. History database 314 stores a history of federated queries and source queries that have been included in requests received by access controller 310. Access controller 310 stores information from request 320 and metadata of request 320 into history database 314. In an example, information from request 320 includes source query 202 and federated query 112. Access controller 310 may assign an identifier to federated query 112 and source query 202. Metadata of request 320 may include the date and time the request was received by access controller 310, the date and time the request was sent from the request controller, and/or an association between source query 202 and federated query 112.

In the future, if access controller 310 receives a request including federated query 112 or source query 202, access controller 310 is able to determine whether federated query 112 and/or source query 202 has been previously received by access controller 310. To avoid storing old data, history database 314 may be configured to store the history of federated queries and source queries that have been received within a particular time frame (e.g., the last six months).

Table A provides an example of history database 314, which stores data about one or more federated queries and source queries associated with a request received by access controller 310.

TABLE A

| Queries | Date | Federated Query ID | Source Query ID | Associated Request | Demo Flag |
|---|---|---|---|---|---|
| Select * from People and Select * from Accounts | 1/1/14 at 12:00 PM | F1 | S1, S2 | 320 | 0 |

TABLE A-continued

| Queries | Date | Federated Query ID | Source Query ID | Associated Request | Demo Flag |
|---|---|---|---|---|---|
| Select * from AnotherTable and Select * from Accounts | 1/1/14 at 12:05 PM | F2 | S2, S3 | 321 | 0 |
| Select * from People | 1/1/14 at 12:00 PM | | S1 | 320 | 0 |
| Select * from Accounts | 1/1/14 at 12:02 PM; 1/1/14 at 12:05 PM; | | S2 | 325, 321 | 0 |
| Select * from AnotherTable | 1/1/14 at 12:07 PM; | | S3 | 321 | 0 |

In Table A, history database 314 stores history records of queries associated with a request received within a particular time period by access controller 310. The history records may include federated queries associated with a request received by access controller 310, source queries that were embedded in those federated queries, IDs of the federated queries and source queries, and the date and time the request including the federated query and/or source query was received by access controller 310. Table A also includes a demo flag column that indicates whether a query (e.g., federated query or source query) is in demo mode, as will be discussed in further detail below. A demo flag may be associated with a federated query and/or a source query. The history database may include other information.

The first row of Table A indicates that on Jan. 1, 2014 at 12:00 PM, access controller 310 received request 320, which is associated with federated query "F1" (e.g., federated query 112). Federated query "F1" includes source query 202, Select*from People, and source query 204, Select*from Accounts. As indicated by the third row of Table A, source query 202 has a source query ID "S1", and on Jan. 1, 2014 at 12:00 PM, access controller 310 received source query 202 in relation to request 320 and federated query 112. Similarly, as indicated by the fourth row of Table A, source query 204 has a source query ID "S2", and on Jan. 1, 2014 at 12:02 PM, access controller 310 received source query 204 in relation to a request 325 and federated query 112. In such an example, request controller 306 may send a request 325 along with federated query 112 to access controller 310, where request 325 includes a request to submit source query 204 to target data source 106.

The second row of Table A indicates that on Jan. 1, 2014 at 12:05 PM, access controller 310 received a request 321, which is associated with a federated query having a federated query ID "F2". Federated query "F2" includes source query 204, Select*from Accounts, and a source query, Select*from AnotherTable, which has a source query ID "S3". As indicated by the fourth row of Table A, on Jan. 1, 2014 at 12:05 PM, access controller 310 received source query 204 in relation to request 321 and federated query "F2". Similarly, as indicated by the fifth row of Table A, on Jan. 1, 2014 at 12:07 PM, access controller 310 received source query "S3" in relation to request 321 and federated query "F2".

2. Rules Database

Rules database 312 stores access rules that assist access controller 310 in determining whether to instruct a request controller to execute a source query. In an example, request 320 includes a request to determine whether a particular source query or federated query complies with one or more rules stored in rules database 312. Access to data may be defined by rules stored in rules database 312. A rule may define the behavior of a request controller in relation to a specific source query sent by data federation tool 120. A data provider may statically or dynamically define rules and store the rules in rules database 312.

Table B provides an example of rules database 312, which stores one or more rules associated with one or more federated queries and/or source queries.

TABLE B

| No. | Queries | Rule | Federated Query ID | Source Query ID |
|---|---|---|---|---|
| 1 | Select * from People and Select * from Accounts | Not executed more than three times within a three-hour window | F1 | S1, S2 |
| 2 | Select * from People | Not executed more than once within a one-hour window | | S1 |
| 3 | Select * from Accounts | Do not join with data from "AnotherTable" | | S2 |
| 4 | * | If the query at a data source is new, record the query in history database and do not provide a result to the client | | |
| ... | | | | |
| N | Select * from Age | Query cannot search for entry that starts with a letter | F3 | S5 |

Table B illustrates five records of rules associated with a source query or federated query. The rules records may include rules to apply to particular federated queries or source queries to assist access controller 310 in, for example, determining whether to allow the request controller to submit the source query to the target database, deny the request controller permission to submit the source query to the target database, instruct the request controller to delay submission of the source query to the target database, or instruct the request controller to demo the query.

The first row of Table B indicates that federated query "F1" (e.g., federated query 112) is not to be executed against a database more than three times within a three-hour window. The query in the first row is a federated query and includes source queries "S1" (e.g., source query 202) and "S2" (e.g., source query 204). The rule in the first row of Table B may be referred to as a time rule, which sets a maximum number of times a particular query may be executed within a time window. A time rule may prevent or reduce the possibility of a data source becoming overloaded. The second row of Table B indicates that source query "S1" (e.g., source query 202) is not to be executed against a database more than once within a one-hour window.

The third row of Table B indicates that source query "S2" (e.g., source query 204) is not to be joined with data from "AnotherTable". In such an example, the data provider may allow data based on the source query "Select*from Accounts" to be extracted and may separately allow data based on the source query "Select*from AnotherTable" to be extracted. If, however, a federated query includes both of these source queries, access controller 310 may deny permission to join these two views together.

The fourth row of Table B indicates that all queries (e.g., federated query or source query) that have not yet been executed against a data source are to be recorded in history database 314 and a result of the query should not be provided to the client. When the rule is applied, an administrator may analyze and evaluate the query along with its results and dynamically create a new rule for the query. The administrator may store the new rule into rules database 312. In an example, the administrator creates a rule that allows the particular source query to be executed against the database. The Nth row of Table B indicates that source query "S5" cannot search for an entry that starts with a letter. The rule in the Nth row of Table B may be referred to as a semantic rule, which takes into consideration the structure, conditions, and/or joins of the query.

IV. Interaction Between Access Controller and Request Controller

In an embodiment, access controller 310 provides an instruction to request controller 304 to perform an action in relation to source query 202 by implementing an example routine in Table C. In an example, access controller 310 evaluates request 320 and sends response 322 back to request controller 304 in accordance with the routine in Table C.

controller 310. Access controller 310 may receive the request from a request controller (e.g., request controller 304 or 306). In an example, a query is associated with a request if the query is included in the request. To determine whether a query has been previously received by access controller 310, it may search history database 314 for the query.

A. Delay Execution of Source Query Against Data Source

Access controller 310 determines whether a request has been previously received. As illustrated at line 7 of Table C, access controller 310 searches history database 314 and loads history records for the current request. As illustrated at lines 8-13 of Table C, when it is determined that the request has been previously received (e.g., if the current request has any history), access controller 310 calculates the time from the most recently received request (e.g., calculates a time since that request was last received). The request has been previously received if, for example, access controller 310 has received the request or queries included in the request within a particular time period.

Access controller 310 determines whether the execution of the request complies with a time rule. Access controller

TABLE C

```
Input: Request information on the current request sent by data federation tool   //line 1
    // The current request may include the federated query along with the source query
Output: Instruction to the request controller to ALLOW, DENY, DELAY or DEMO
execution of the source query included in the request
                                                                                  //line 5
Save information about the current request into history database
Load history records for the current request
If current request has any history {
    Calculate time from the last request
    If not(frequency of request is acceptable // may look in rules database)     //line 10
        Return DELAY
    }
}
Load rules from rules database, where loaded rules match the current request    //line 15
If request matches with rule stored in the rules database {
    If defined rule has demo flag set then {
        Return DEMO
    }
    Else {                                                                       //line 20
        If defined rule permits execution {
            return ALLOW
        }
        Else {Return DENY}
    }                                                                            //line 25
}
Else {
    Switch the data federation tool into a demo mode for the current request
    Save information about request into rules database with flag "demo"
    Return DEMO                                                                  //line 30
}
```

As illustrated at lines 1-4 of Table C, access controller 310 receives the request (e.g., request 320) and outputs an instruction to allow, deny, delay, or demo execution of the source query to request controller 304. In an example, access controller 310 provides response 322 to request controller 304, where response 322 includes an instruction to execute the source query, to delay execution of the source query, not to execute the source query, or to "demo" the source query. Each of these instructions will be further discussed below. The request controller receives response 322 from access controller 310, and based on the instruction the request controller performs an action and may provide a result to data federation tool 120.

As illustrated at line 6 of Table C, access controller 310 saves information about the received request (e.g., request 320) into history database 314. In an example, history database 314 stores a history of federated queries and source queries that are associated with requests received by access 310 may search rules database 312 for time rules. When execution of the request is determined to not comply with the time rule, access controller 310 sends a communication to request controller 304 to cause request controller 304 to delay submission of source query 202 to data source 104 in accordance with the time rule. In an example, if the frequency of the request is not acceptable, access controller 310 returns response 322 including an instruction that causes request controller 304 to delay sending source query 202 to data source 104. Access controller 310 may also include in response 322 a time period for request controller 304 to wait before submitting source query 202 to data source 104.

Referring to row three of the example history database illustrated in Table A, source query 202 (source query "S1") was last received on Jan. 1, 2014 at 12:00 PM. Access controller 310 may search rules database 312 for a rule that matches request 320. A rule that includes a given query matches a request that includes the given query. The rule that matches the request may be applied to the request or to the given query. The rule in row two of the example rules database illustrated in Table B includes source query 202. Thus, the rule in row two, "Not executed more than once within a one-hour window", matches request 320, which includes source query 202. The matched rule indicates that source query 202 is not to be executed more than once within a one-hour window. If access controller 310 receives request 320 on Jan. 1, 2014 at 1:05 PM, response 322 does not include the "DELAY" instruction in response 322.

In contrast, if access controller 310 receives request 320 on Jan. 1, 2014 at 12:58 PM, access controller 310 sends response 322 to request controller 304, where response 322 includes "DELAY" and "3", which indicates to request controller 304 to delay the submission of source query 202 to data source 104 for three minutes. Request controller 304 may receive response 322 including "DELAY" and "3" and wait for the indicated period of time before submitting source query 202 to data source 104.

Although response 322 is described as including a number indicating the amount of time for the request controller to wait, this is not intended to be limiting. In another example, a request controller may have a default time period to wait and may wait this default time period before submitting the source query to the data source. In another example, the longest time window in the rules database 312 is used to determine the default time period. In the example rules database illustrated in Table B, the longest window is a three-hour window and this may be the default time period.

After the time period has elapsed, request controller 304 submits source query 202 to data source 104 for execution. Source query 202 may be executed against data source 104, which provides the result of source query 202 to request controller 304. Request controller 304 provides the result of source query 202 to data federation tool 120 for processing. Although request controller 304 intentionally delayed submission of source query 202 to data source 104, this may be transparent to client 102. Client 102 may eventually receive the final result, but be unaware that source query 202 was delayed and may instead think that data federation tool 120 is slow.

B. Request Matches a Rule

Access controller 310 determines whether a request matches at least one rule stored in rules database 312. As illustrated at line 15 of Table C, access controller 310 loads one or more rules stored in rules database 312, where the loaded rules match the current request. A rule may be applied to a given query (e.g., source query or federated query), and a request may include the given query. A rule that includes a given query matches a request that includes the given query. For example, the rule in row one of Table B includes federated query 112 having federated query ID "F1" (Select*from People and Select*from Accounts), source query 202 having source query ID "S1" (Select*from People), and source query 204 having the source query ID "S2" (Select*from Accounts). If request 320 includes federated query 112 and source query 202, the rules in rows one and two match request 320. In such an example, the rule in row three, which includes source query 204, does not match request 320.

Access controller 310 may determine whether request 320 or source query 202 complies with the one or more rules matching the request. For example, access controller 310 determines whether request 120 complies with the rule in row one and whether source query 202 complies with the rule in row two of Table B.

When the request is determined to match at least one rule stored in rules database 312, access controller 310 may determine whether the rule's demo flag set is set. As illustrated at lines 16-19 of Table C, if the request matches with at least one rule stored in rules database 312 and a matching rule has its demo flag set, then access controller 310 sends response 322 to request controller 304, where response 322 includes "DEMO". When a rule's demo flag is set, this may indicate that the rule is in demo mode. A response including 322 "DEMO" indicates to request controller 304 to demo the execution of source query 202 against data source 104.

Access controller 310 determines whether the request matches a rule stored in rules database 312. When the request is determined to match a rule stored in rules database 312, access controller 310 determines whether a demo flag is set for the rule. When the demo flag is determined to be set for the rule, access controller 310 sends a communication to request controller 304 to cause request controller 304 to (i) submit source query 202 to data source 104, and (ii) mask the initial result of source query 202. The initial result of source query 202 has the same structure as the masked result of source query 202.

During the demo phase, a data source is uncertain whether or not to trust data federation tool 120. The demo phase will be described in further detail below. Although the demo flag may be described as being set in relation to a rule, it should also be understood that the demo flag may be set in relation to a particular query (e.g., federated query or source query). For example, a demo flag can be associated with a federated query or a source query in history database 314 and this demo flag may be set for the federated query or source query. Further, when a demo flag is set for a rule, the demo flag may also be set for the one or more queries to which the rule applies.

As illustrated at lines 20-23 of Table C, if the request matches with at least one rule stored in rules database 312 and a matching rule does not have its demo flag set, access controller 310 may determine whether the matching rule permits the source query to be submitted to the data source (e.g., the request complies with the rule). In an embodiment, when the rule is determined to permit the source query to be submitted to the data source, access controller 310, access controller 310 sends a communication to request controller 304 to cause request controller 304 to (i) submit source query 202 to data source 104, and (ii) send a result of source query 202 to data federation tool 120 for processing. In an example, the communication is response 322, where response 322 includes "ALLOW", which indicates to request controller 304 to submit source query 202 to data source 104 for execution. Request controller 304 may receive the response 322 including "ALLOW" and submit source query 202 to data source 104 for execution. Source query 202 may be executed against data source 104, which provides the result to request controller 304. Request controller 304 provides the result to data federation tool 120. If request controller 306 sends a request to access controller 310 and access controller 310 returns a response including "ALLOW", source query 204 may be submitted to data source 106 in parallel with the submission of source query 202 to data source 104.

As illustrated at line 24 of Table C, if the request matches with at least one rule stored in rules database 312 and a matching rule does not have its demo flag set, access controller 310 may determine whether the matching rule permits the source query to be submitted to the data source (e.g., the request complies with the rule). In an embodiment, when the rule is determined to not permit the source query to be submitted to the data source, access controller 310 sends a communication to request controller 304 to cause request controller 304 to discard the source query. The communication may also cause an empty message to be sent to a client that submitted the federated query. In an example, the communication is response 322, where response 322 includes "DENY", which indicates to request controller 304 to discard source query 202. Request controller 304 may receive the response 322 including "DENY" and discard source query 202. In such an example, request controller 304 does not submit source query 202 to data source 104. The communication may also cause request controller 304 to send to data federation tool 120 an empty message or a message indicating that client 102 does not have access to the requested data.

C. Request does not Match a Rule

As illustrated at lines 27-31 of Table C, if the rule does not match with at least one rule stored in rules database 312, access controller 310 switches data federation tool 120 to demo mode for request 320. Access controller 310 may switch data federation tool 120 to demo mode by using results proxy 126. Access controller 310 may set a demo flag associated with federated query 120, set a demo flag associated with source query 202, and/or set a demo flag associated with request 320.

Access controller 310 determines whether a request matches at least one rule stored in rules database 312. When it is determined that the request does not match any rules stored in rules database 314, the rule is set to demo mode. In an example, access controller 310 saves information about request 320 into history database 314 with the demo flag corresponding to request 320 set and sends response 322 to request controller 304, where response 322 includes "DEMO".

In an embodiment, when it is determined that the request does not match any rules stored in rules database 314, access controller 310 sends a communication to request controller 314 to cause request controller 314 to (i) submit source query 202 to data source 104, and (ii) mask an initial result of source query 202. The initial result of source query 202 has the same structure as the masked result of source query 202. In an example, the communication is response 322, where response 322 includes "DEMO", which indicates to request controller 304 to submit source query 202 to data source 104 and mask an initial result of source query 202. The initial result of source query 202 has the same structure as the masked result of source query 202. Request controller 304 may receive response 322 including "DEMO" and submit source query 202 to data source 104 for execution. Source query 202 may be executed against data source 104, which provides an initial result to request controller 304.

Request controller 304 receives the initial result of source query 202 and may remember that request 320 has its demo flag set. The initial result contains data that is stored in data source 104 and that was extracted from data source 104 in accordance with the execution of source query 202 against the data source. During the demo phase, a data source is uncertain whether or not to trust data federation tool 120. Accordingly, request controller 304 modifies the initial result of source query 202 before sending a result of source query to data federation tool 120. Data federation tool 120 is unable to view the actual data stored in data source 104 because the actual data that was included in the initial result has been masked.

In an example, request controller 304 masks the initial result of source query 202 without breaking the structure of the initial result. Request controller 304 masks the initial result because trust between data federation tool 120 and the data provider has not yet been established for the current request. In an example, request controller 304 masks the initial result by corrupting the data returned in the initial result, but preserving the structure of the initial result. Request controller 304 may preserve the structure of the initial result by preserving the data types returned in the initial result, preserving the order in which the data types are listed in the initial result, and/or keeping track of the number of records returned in the initial result.

For example, source query 202 may retrieve the first, last, and middle names of customers that subscribe to a particular service. Request controller 304 may submit the source query to data source 104, which returns an initial result including a list of the following customer names: "John Smith", "Jane Doe". Data source 104 sends the initial result to request controller 304. During the demo phase, request controller 304 may mask the initial result by corrupting the actual data (stored in and extracted from the data source) returned in the initial result. For example, request controller 304 may mask the initial result such that the masked result is a list including the following: "string", "49DJ$", "7fj3". The masked result includes "dummy" data and indicates that the data type of the initial result included a string and two records were retrieved from data source 104 in accordance with the execution of the source query. The structure of the initial result is maintained and the same as the structure in the masked result.

In another example, a source query may retrieve the age of customers that subscribe to the particular service. Request controller 304 may submit the source query to a data source, which returns an initial result including a list of the following customer ages: "19", "35". Data source 104 sends the initial result to request controller 304. During the demo phase, request controller 304 may mask the initial result by corrupting the actual data returned in the initial result. For example, request controller 304 may mask the initial result such that the masked result is a list including the following: "int", "−6", "%#". The masked result indicates that the data type of the initial result included an integer and two records were retrieved from data source 104 in accordance with the execution of the source query. The structure of the initial result is maintained and the same as the structure in the masked result.

The data provider may desire to provide the masked result (containing dummy data) rather than the initial result to data federation tool 120. Providing the masked result to data federation tool 120 enables the data provider to protect the data contents stored in the data provider's data sources from viewing by data federation tool 120. Rather, the data provider provides data federation tool 120 with dummy data and is not forced to disclose the data provider's actual data to data federation tool 120. Request controller 304 provides the masked result (rather than the initial result) to data federation tool 120. Data federation tool 120 may be unaware that the result sent by a request controller includes dummy data.

V. Final Result

A. Request Proxy Interacts with the Access Controller

When a request controller sends a result to data federation tool 120, data proxy 124 receives the result. Data proxy 124 may receive a result of source query 202 from request controller 304 and may also receive a result of source query 204 from request controller 306. The result of source query 202 may or may not be a masked result. Similarly, the result of source query 204 may or may not be a masked result. A result of a source query may contain masked data if the demo flag of the request associated with the source query is set. Data proxy 124 may be unaware whether a result is a masked result and passes the results along to data federation tool 120 to federate.

Data federation tool 120 receives the results and may be unaware whether the results contain a masked result. Data federation tool 120 federates the logic and provides a common view based on the results from data proxy 124. In an example, data federation tool 120 "mixes" the results (that may contain actual data stored in a data source or dummy data) and links these results together to determine a final result 340, which includes a common view of the data. Accordingly, final result 340 may (or may not) contain masked data mixed with actual data. If a result includes a masked result, data federation tool 120 is unable to view the real business data or the "real" common view of the data. Data federation tool 120 passes final result 340 to results proxy 126.

Results proxy 126 receives final result 340. Results proxy 126 associates federated query 112 or request 320 with final result 340. Results proxy 126 sends final result 340 to access controller 310 to store in history database 314. Based on federated query 112, results proxy 126 may now know what data client 102 has access to and may send this information to access controller 310 to store in rules database 312. Results proxy 126 associates federated query 112 or request 320 with final result 240, and access controller 310 saves this information into history database 314.

Access controller 310 may receive final result 314 of federated query 112. Access controller 310 associates the final result with federated query 112 and source query 202, and stores federated query 112 and source query 202 into history database 314. Access controller 310 now has a record of how client 102 tried to access the data provider's data source. Access controller 310 determines whether final result 340 includes a masked result of a source query embedded in federated query 112. When final result 340 is determined to not include a masked result of a source query, access controller 310 also stores final result 340 into history database 314.

When final result 340 is determined to include a masked result of a source query, access controller 310 unmasks the masked result. To unmask the masked result, access controller 310 may communicate with the request controller that masked the initial result. Access controller 310 stores the unmasked result in history database 314. Access controller 310 associates final result 340 with federated query 112 and/or the source queries embedded in federated query 112 in history database 314.

Additionally, when final result 340 is determined to include a masked result of a source query, access controller 310 may send a data provider that manages the data source associated with the masked result an alert. Access controller 310 may store the source query and the initial result of the source query into rules database 312 and allow the data provider to insert a rule for the source query, the federated query in which the source query was embedded, or a request associated with the source query. Access controller 310 informs the data provider about a new rule that is waiting for analysis from the data provider. Access controller 310 provides federated query 112 and the final result of federated query 112 to the data provider.

Accordingly, the data provider (e.g., an administrator) has a picture of the full federated query, executed source queries, the final result, and the results of the executed source queries provided to client 102. The data provider may review the usage of the data with the result(s) of the query(ies) and create one or more rules to store in rules database 312. The data provider may analyze how the data was processed and how the data is used in the final aggregated data. The data provider has control over what kind of queries are allowed to be processed and also has a better picture of how data is used in the federation system. When a similar query is received at a later point in time, the rule is applied to the query and a result is provided to the client based on, for example, whether the query complies with the rules in rules database 312.

The data provider may create a new rule for the federated query associated with the masked result, the source query associated with the masked result, and/or the request that included the federated query and/or source query associated with the masked result. In an example, the data provider sends a request to access controller 310 to store the new rule. In such an example, access controller 310 receives the new rule and stores it in rules database 312. The data provider may unset the demo flag of the federated query associated with the masked result, unset the demo flag of the source query associated with the masked result, and/or unset the demo flag of the request that included the federated query and/or source query associated with the masked result.

B. Request Proxy May Send Final Result to Client

To determine whether to send final result 340 to client 102, results proxy 126 may determine whether final result 340 contains masked data. Results proxy 126 is located between access controller 310 and client 102 and may communicate with access controller 310 to determine whether a request associated with the final result has been set to demo mode. Access controller 310 knows this information because access controller 310 initially set the demo flag for the request. Results proxy 126 communicates with access controller 310 to determine whether final result 340 contains masked data. If final result 340 does not contain masked data (e.g., access controller 310 returned "ALLOW" or "DELAY" to the request controllers), results proxy 126 sends final result 340 to client 102. In such an example, client 102 may be provided with the common view.

If final result 340 contains an empty message (e.g., access controller 310 returned "DENY" to a request controller), final result 340 may be an empty message. If request controller receives response 322 including "DENY", request controller 304 may discard source query 202 and not submit it to data source 104 for execution. Request controller 304 may also send an empty message to data proxy 124, which passes the empty message to data federation tool 120 to "mix" with the result of source query 204 from request controller 306. If at least one of the results sent from a request controller is empty, data federation tool 120 may determine that final result 340 is an empty message. In such an example, results proxy 126 may send an empty message to client 102.

If final result 340 contains masked data (e.g., access controller 310 returned "DEMO" to a request controller), results proxy 126 sends final result 340 to access controller 310 and may send an empty message to client 102 or may send no message to client 102.

As discussed above and further emphasized here, FIGS. 1-3 are merely examples, which should not unduly limit the scope of the claims.

VI. Example Method

Figure 4:
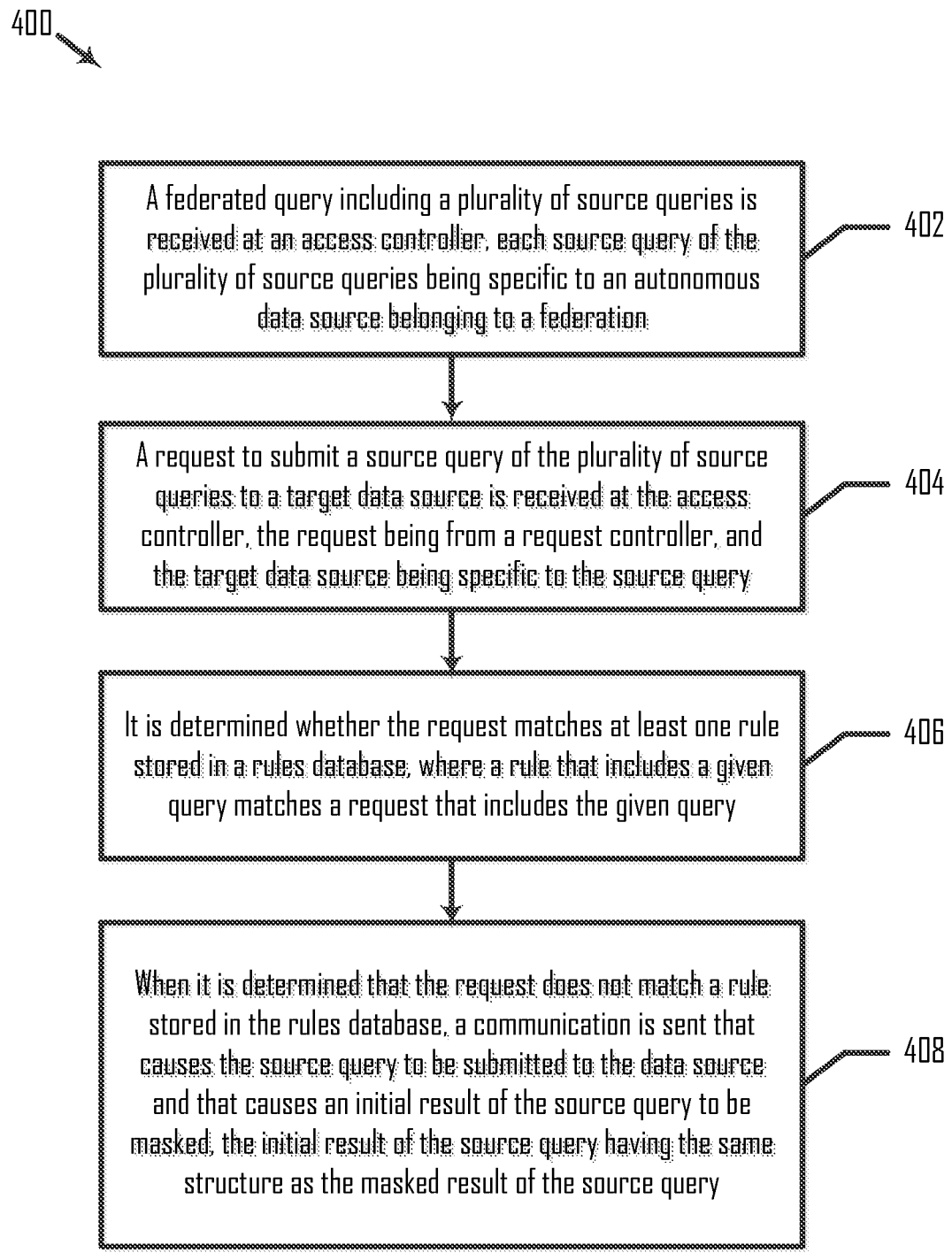
FIG. 4 is a flowchart illustrating a method of controlling access to data stored in a plurality of autonomous data sources, according to an embodiment.

FIG. 4 is a flowchart illustrating a method 400 of controlling access to data stored in a plurality of autonomous data sources, according to an embodiment. Method 400 is not meant to be limiting and may be used in other applications.

In FIG. 4, method 400 includes blocks 402-408. In a block 402, a federated query including a plurality of source queries is received at an access controller, each source query of the plurality of source queries being specific to an autonomous data source belonging to a federation. In an example, access controller 310 receives federated query 122 including source queries 202 and 204, each source query being specific to an autonomous data source belonging to a federation.

In a block 404, a request to submit a source query of the plurality of source queries to a target data source is received at the access controller, the request being from a request controller, and the target data source being specific to the source query. In an example, access controller 310 receives a request 320 to submit source query 202 to a target data source 104, request 320 being from request controller 304, and data source 104 being specific to source query 202.

In a block 406, it is determined whether the request matches at least one rule stored in a rules database, where a rule that includes a given query matches a request that includes the given query. In an example, access controller 310 determines whether request 320 matches at least one rule stored in rules database 312, where a rule that includes a given query matches a request that includes the given query.

In a block 408, when it is determined that the request does not match a rule stored in the rules database, a communication is sent that causes the source query to be submitted to the data source and that causes an initial result of the source query to be masked, the initial result of the source query having the same structure as the masked result of the source query. In an example, when it is determined that request 320 does not match a rule stored in rules database 314, access controller 310 sends a communication to request controller 304 to cause request controller 304 to (i) submit source query 202 to data source 104, and (ii) mask an initial result of source query 202, the initial result of source query 202 having the same structure as the masked result of source query 202.

It is also understood that additional processes may be inserted before, during, or after blocks 402-408 discussed above. It is also understood that one or more of the blocks of method 400 described herein may be omitted, combined, or performed in a different sequence as desired.

VII. Example Computing System

Figure 5:
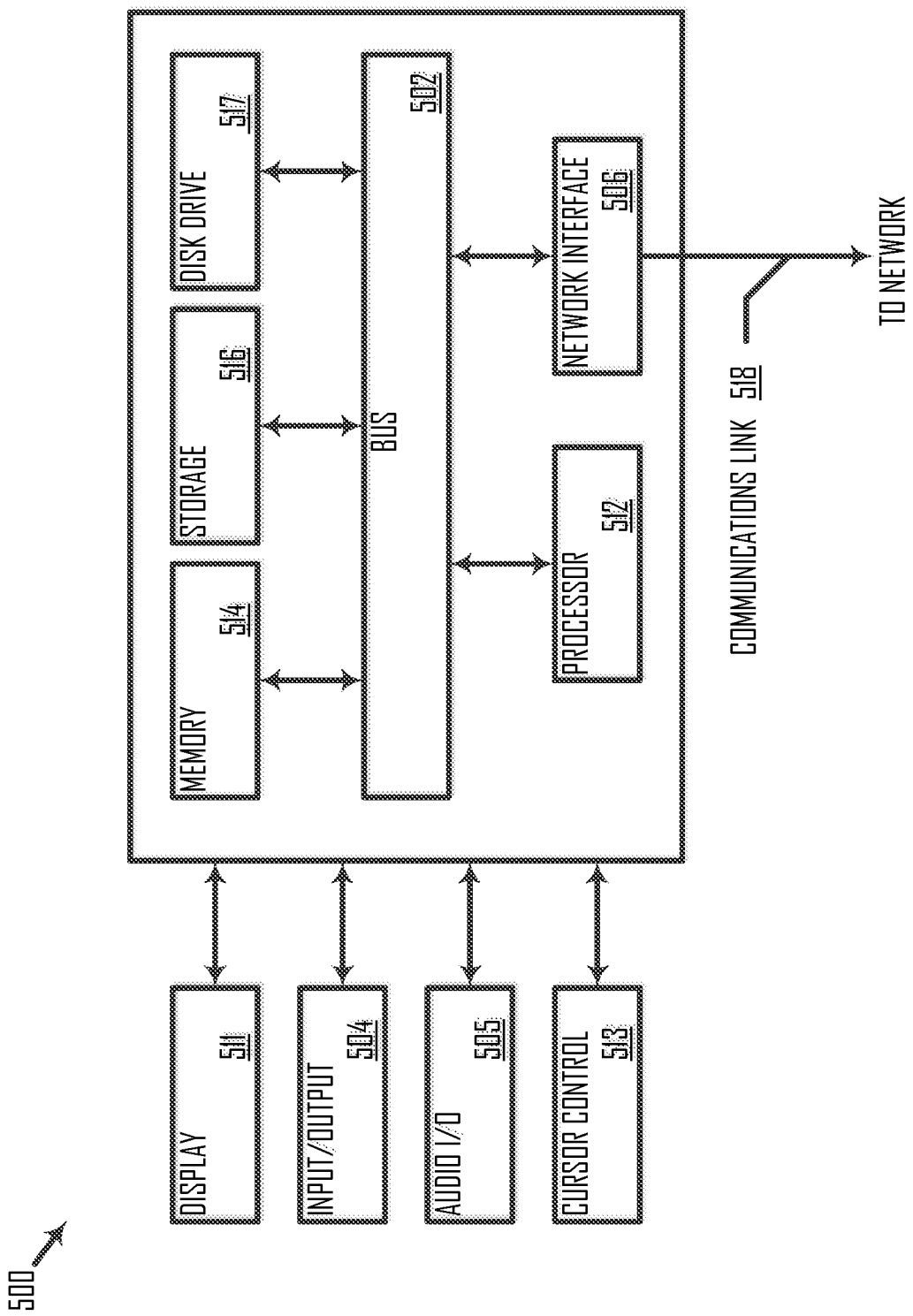
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, computing device 102 may include a client or a server computing device that includes one or more processors and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a microcontroller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various action described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of controlling access to data stored in a plurality of autonomous data sources, comprising:
    receiving at an access controller a request to submit a source query to a target data source, the request being from a request controller, the source query being embedded in a federated query, and the target data source being specific to the source query;
    determining whether the request matches at least one rule stored in a rules database;
    in response to a determination that the request does not match at least one rule stored in the rules database, setting the source query to a demo mode;
    determining whether the source query is set to the demo mode;
    in response to a determination that the source query is set to the demo mode, sending a communication to the request controller to cause the request controller to (i) submit the source query to the data source, (ii) mask an initial result of the source query, and (iii) send the masked initial result of the source query to a data federation tool, the initial result of the source query having the same structure as the masked initial result, wherein the masked initial result includes dummy data;
    receiving at the access controller a final result of the federated query;
    determining whether the final result includes one or more masked results;
    in response to a determination that the final result does not include one or more masked results, storing the final result into a history database;
    in response to a determination that the final result includes the masked initial result of the source query, unmasking the masked initial result and storing the unmasked result in the history database, the unmasked result including data stored in the data source;
    in response to a determination that the source query is not set to the demo mode:
        determining whether the source query complies with each rule that matches the request; and
        in response to a determination that the source query complies with each rule that matches the request, sending a communication to the request controller to cause the request controller to (i) submit the source query to the data source, and (ii) send the initial result of the source query to the data federation tool; and
    in response to the determination that the final result includes the masked initial result of the source query:
        providing the federated query and the final result of the federated query to a data provider that manages the data source;
        receiving a new rule for the source query;
        storing the source query and the new rule into the rules database; and
        setting the source query to a non-demo mode.

2. The method of claim 1, further including:
    in response to a determination that the source query does not comply with each rule that matches the request, sending a communication to the request controller to cause the request controller to discard the source query.

3. The method of claim 1, further including:
    in response to a determination that the source query does not comply with a time rule that matches the request, determining whether to delay submission of the source query to the data source; and
    in response to a determination to delay submission of the source query to the data source, sending a communication to the request controller to cause the request controller to submit the source query to the data source after a specified time period has elapsed.

4. The method of claim 1, further including:
    receiving at the access controller a second request to submit a second source query to a second target data source, the second request being from a second request controller, the second source query being embedded in the federated query, and the second target data source being specific to the second source query;
    determining that the second source query complies with each rule that matches the second request; and
    in response to a determination that the second source query complies with each rule that matches the second request, sending a communication to the second request controller to cause the second request controller to (i) submit the second source query to the second data source, and (ii) send a second initial result of the second source query to the data federation tool.

5. The method of claim 1, wherein determining whether the source query is set to the demo mode includes in response to a determination that the request matches at least one rule in the rules database, determining whether the source query is set to the demo mode.

6. The method of claim 1, further including:
    in response to a determination that the source query does not comply with each rule that matches the request, sending a communication that causes an empty message to be sent to a client that submitted the federated query.

7. The method of claim 3, further including:
    in response to a determination to not delay submission of the source query to the data source, sending a communication to the request controller to cause the request controller to discard the source query.

8. The method of claim 4, wherein the final result includes the second initial result of the second source query, the method further including:
sending a communication to the first request controller to unmask the masked initial result; and
storing the second initial result of the second source query into the history database.

9. The method of claim 4, further including:
receiving at the access controller a second request to submit a second source query to a second target data source, the second request being from the second request controller, the second source query being embedded in the federated query, and the second target data source being specific to the second source query;
determining that the second source query is set to the demo mode; and
in response to a determination that the second source query is set to the demo mode, sending a communication to the request controller to cause the request controller to (i) submit the second source query to the second data source, (ii) mask the second initial result of the second source query, and (iii) send the masked second initial result of the second source query to the data federation tool, the second initial result of the second source query having the same structure as the masked second initial result.

10. The method of claim 9, wherein the final result includes the masked initial result of the first source query and the masked second initial result of the second source query, the method further including:
sending a communication to the first request controller to unmask the masked initial result;
sending a communication to the second request controller to unmask the masked second initial result;
receiving the second initial result of the second source query in response to the communication to the second request controller to unmask the masked second initial result; and
storing the second initial result into the history database.

11. A system for controlling access to data stored in a plurality of autonomous data sources, comprising:
a non-transitory memory; and
one or more hardware processors coupled to the non-transitory memory and configured to read instructions from the non-transitory memory to cause the system to perform operations comprising:
receiving at an access controller a request to submit a source query to a target data source, the request being from a request controller, the source query being embedded in a federated query, and the target data source being specific to the source query;
determining whether the request matches at least one rule stored in a rules database;
in response to a determination that the request does not match at least one rule stored in the rules database, setting the source query to a demo mode;
determining whether the source query is set to the demo mode;
in response to a determination that the source query is set to the demo mode, sending a communication to the request controller to cause the request controller to (i) submit the source query to the target data source, (ii) mask an initial result of the source query, and (iii) send the masked initial result of the source query to a data federation tool, the initial result of the source query having the same structure as the masked initial result, wherein the masked initial result includes dummy data;
receiving at the access controller a final result of the federated query;
determining whether the final result includes one or more masked results;
in response to a determination that the final result does not include one or more masked results, storing the final result into a history database;
in response to a determination that the final result includes the masked initial result of the source query, unmasking the masked initial result of the source query and storing the unmasked result in the history database, the unmasked result including data stored in the data source;
in response to a determination that the source query is not set to the demo mode:
determining whether the source query complies with each rule that matches the request; and
in response to a determination that the source query complies with each rule that matches the request, sending a communication to the request controller to cause the request controller to (i) submit the source query to the target data source, and (ii) send the initial result of the source query to the data federation tool; and
in response to the determination that the final result includes the masked initial result of the source query:
providing the federated query and the final result of the federated query to a data provider that manages the data source;
receiving a new rule for the source query;
storing the source query and the new rule into the rules database; and
setting the source query to a non-demo mode.

12. The system of claim 11, wherein the operations further include:
receiving a second request to submit a second source query to a second data source, wherein the second source query is embedded in the federated query; and
in response to a determination that the second request matches a set of rules stored in the rules database and that the second source query complies with the set of rules and is not set to the demo mode, sending a communication to the request controller to cause the request controller to (i) submit the second source query to the target data source, and (ii) send the initial result of the second source query to the data federation tool.

13. The system of claim 12, wherein the final result includes the masked initial result of the first source query and a second initial result of the second source query, and wherein the operations further include:
sending a request to the request controller to unmask the masked initial result.

14. The system of claim 12, wherein the operations further include:
determining whether execution of the second source query against the second data source complies with a time rule; and
if execution of the second source query is determined to not comply with the time rule, sending a communication to the request controller to cause the request controller to delay submission of the second source query to the second data source in accordance with the time rule.

15. The system of claim 13, wherein the second initial result of the second source query is stored in the second data source.

16. The system of claim 12, wherein the operations further include:
- determining whether the final result contains masked data;
- if the final result contains masked data, sending the final result for storage into a history database, wherein the history database stores one or more queries previously received by the data federation tool; and
- in response to the determination that the final result does not include one or more masked results, sending the final result to a client that submitted the federated query.

17. A machine-readable medium comprising a plurality of machine-readable instructions that when executed by one or more processors is adapted to cause the one or more processors to perform a method comprising:
- receiving at an access controller a request to submit a source query to a target data source, the request being from a request controller, the source query being embedded in a federated query, and the target data source being specific to the source query;
- determining whether the request matches at least one rule stored in a rules database;
- in response to a determination that the request does not match at least one rule stored in the rules database, setting the source query to a demo mode;
- determining whether the source query is set to the demo mode;
- in response to a determination that the source query is set to the demo mode, sending a communication to the request controller to cause the request controller to (i) submit the source query to the target data source, (ii) mask an initial result of the source query, and (iii) send the masked initial result of the source query to a data federation tool, the initial result of the source query having the same structure as the masked initial result, wherein the masked initial result includes dummy data;
- receiving at the access controller a final result of the federated query;
- determining whether the final result includes one or more masked results;
- in response to a determination that the final result does not include one or more masked results, storing the final result into a history database;
- in response to a determination that the final result includes the masked initial result of the source query, unmasking the masked initial result and storing the unmasked result in the history database, the unmasked result including data stored in the data source;
- in response to a determination that the source query is not set to the demo mode:
  - determining whether the source query complies with each rule that matches the request; and
  - in response to a determination that the source query complies with each rule that matches the request, sending a communication to the request controller to cause the request controller to (i) submit the source query to the target data source, and (ii) send the initial result of the source query to the data federation tool; and
- in response to the determination that the final result includes the masked initial result of the source query:
  - providing the federated query and the final result of the federated query to a data provider that manages the data source;
  - receiving a new rule for the source query;
  - storing the source query and the new rule into the rules database; and
  - setting the source query to a non-demo mode.

* * * * *